US005162828A

United States Patent [19]
Furness et al.

[11] Patent Number: 5,162,828
[45] Date of Patent: Nov. 10, 1992

[54] DISPLAY SYSTEM FOR A HEAD MOUNTED VIEWING TRANSPARENCY

[76] Inventors: Thomas A. Furness, 4070 Hyland Dr., Dayton, Ohio 45424; Robert E. Fischer, 2060 Hillsbury, Westlake Village, Calif. 91362; Peter K. Purdy, 4233 Phinney Ave., N., Seattle, Wash. 98103; Kirk Beach, 2411 24th E., Seattle, Wash. 98112

[21] Appl. No.: 345,886

[22] Filed: May 1, 1989

Related U.S. Application Data

[63] Continuation-in-part of PCT/US87/02455, Sep. 24, 1987 continuation-in-part of Ser. No. 36,826, Apr. 10, 1987, Pat No. 4,757,714, which is a continuation-in-part of Ser. No. 911,573, Sep. 25, 1986, Pat. No. 4,722,222.

[51] Int. Cl.⁵ ............................................. G02B 24/17
[52] U.S. Cl. .................................... 353/122; 351/158; 359/618
[58] Field of Search ............... 340/705; 353/30–37, 353/122, 101, 14; 350/169–174; 351/158, 119, 120

[56] References Cited

U.S. PATENT DOCUMENTS

| | | | |
|---|---|---|---|
| 1,871,877 | 8/1932 | Buckman | 353/14 |
| 2,513,102 | 6/1950 | Parlini | 353/113 X |
| 3,666,887 | 5/1972 | Freeman | 350/174 X |
| 3,712,714 | 1/1973 | Uyeda | 340/705 |
| 3,816,005 | 6/1974 | Kirschner | 350/174 X |
| 3,907,410 | 9/1975 | Richmond | 351/119 |
| 3,923,370 | 12/1975 | Mostrom | 350/174 X |
| 4,081,209 | 3/1978 | Heller | 350/174 |
| 4,294,524 | 10/1981 | Stolov | 353/122 X |
| 4,414,431 | 11/1983 | McCartney . | |
| 4,735,473 | 4/1988 | Migozzi | 350/174 X |
| 4,751,691 | 6/1988 | Perera | 351/158 X |
| 4,753,514 | 6/1988 | Kubik | 350/174 |
| 4,806,011 | 2/1989 | Bettinger | 351/158 |

FOREIGN PATENT DOCUMENTS

| | | | |
|---|---|---|---|
| 1438789 | 9/1976 | United Kingdom | 350/174 |
| 2149140 | 6/1985 | United Kingdom | 353/30 |

OTHER PUBLICATIONS

IBM Tech. Disc. Bull., vol. 22, #1, Jun. 1979, projected image display–Leon–.
Displays, vol. 2, #3, Oct. 1980, pp. 129–130, Helmut mounted display system etc–Walker et al.

*Primary Examiner*—Harry N. Haroian
*Attorney, Agent, or Firm*—McAndrews, Held & Malloy, Ltd.

[57] ABSTRACT

A display system for conventional eyewear having a transparency that defines a field of view and a frame for supporting the transparency on a user's head is shown. The display system includes a light transmissive display mounted on the frame of the eyewear and optics for collimating light to project an image of the displayed information at a distance from the user in the periphery of the field of view defined by the transparency. The optics may include a single mirror that receives the information directly from the display wherein the mirror is toroidal or the like so as to project an enlarged image at an apparent optical distance from the user that is greater than the actual optical path. Alternatively, a planar mirror may be employed with a collimating lens to project the image at a desired distance from the user. The mirror may be fully reflective or partially reflective so as to superimpose the image of the displayed information on the scene viewed by the user through the transparency of the eyewear. Further, means are provided for automatically adjusting the optical path defined by the relative position of the mirror, the display and the user's eye to accommodate heads of various sizes.

94 Claims, 10 Drawing Sheets

Fig. 18
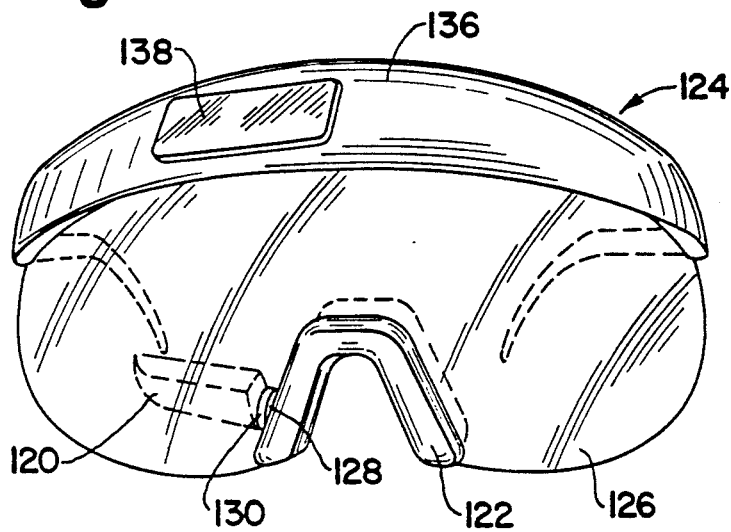
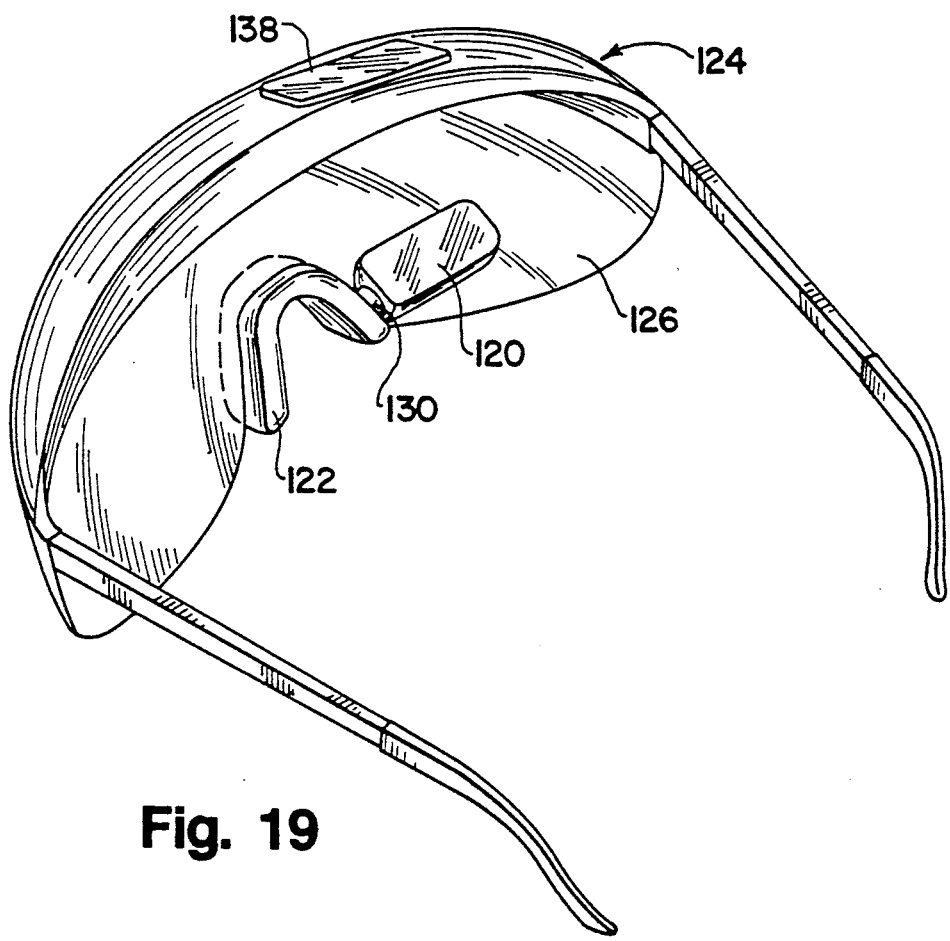
Fig. 19

DISPLAY SYSTEM FOR A HEAD MOUNTED VIEWING TRANSPARENCY

This application is a continuation-in-part of PCT application PCT/US87/02455 having publication No. W088/02494 filed Sep. 24, 1987 which is a continuation-in-part of U.S. patent application Ser. No. 036,826 filed Apr. 10, 1987 and issued Jul. 19, 1988 as U.S. Pat. No. 4,757,714; which is a continuation-in-part of U.S. patent application Ser. No. 911,573 filed Sep. 25, 1986 and issued Feb. 2, 1988 as U.S. Pat. No. 4,722,222.

TECHNICAL FIELD

The present invention relates to a display system and more particularly to a display system for a head mounted viewing transparency such as conventional eyewear, the display system projecting a magnified image of displayed information at a distance from the user in the periphery of the field of view defined by the transparency.

BACKGROUND OF THE INVENTION

Display systems for headgear are known wherein a cathode ray tube is mounted on a helmet to project an image. One such display system is shown in U.S. Pat. No. 3,059,519 wherein the image from the cathode ray tube is projected to an image splitter for right and left eye channels providing a binocular effect. In each of the eye channels a first mirror is mounted on a helmet extension that projects outwardly in front of the user's forehead at a distance therefrom. The first mirror reflects the image from the image splitter to a second mirror that is mounted on a second extension of the helmet that abuts the forehead of the user. The second mirror reflects the image from the first mirror onto a third mirror mounted on the first extension of the helmet so that the image may be viewed by the user. The display system also includes a lens disposed in the optical path to project the image at infinity. Another such display system is shown in U.S. Pat. No. 3,787,109 wherein a partially transparent visor having an inner surface that is shaped as a paraboloid of revolution is mounted on the helmet and wherein a light source is positioned to project from the visor's focal point so that the projected image appears located at infinity, the image being superimposed on the scene viewed through the visor. U.S. Pat. No. 3,833,300 shows another such display system wherein a dual parabolic visor is slidably secured to the helmet and wherein the cathode ray tube projects an image at the focal point of each of the visor's parabola.

Another type of head mounted display system is shown in U.S. Pat. No. 3,170,979 wherein a harness mounts the display system on a user's head. The display system includes a cathode ray tube, the image from which is magnified by a lens assembly and displayed on a see-through reflecting surface that is positioned in the line of sight of the user.

Other display systems, integrally formed into a goggle, or mask are shown in the following. U.S. Pat. No. 4,361,384 shows a goggle or mask having a see-through optical element to permit the simultaneous viewing of an intensified TV image and an object or scene. The goggle or mask is held in place by retaining gear which surrounds the head and cups under the chin. U.S. Pat. No. 3,712,714 shows a diver's mask having status indicators such as a clock and compass mounted to the diver's mask and reflected by a pair of mirrors so as to be viewed by the diver. These prior display systems are cumbersome, bulky and unsuitable for consumer type applications wherein the displayed information must be projected in a manner so as not to interfere with the user's normal field of view.

SUMMARY OF THE INVENTION

In accordance with the present invention, the disadvantages of prior head mounted display systems, as discussed above, have been overcome. The display system for a head mounted viewing transparency in accordance with the present invention includes a display that is mounted on the frame supporting the transparency and optics mounted on the frame with respect to the display for collimating light to project a magnified image of the displayed information at a distance from the user in the periphery of the field of view defined by the transparency.

In one embodiment, the optical apparatus includes a toroidal mirror disposed in the periphery of the field of view defined by the transparency wherein the mirror receives the displayed information directly from the display. In another embodiment, a planar mirror is mounted on the transparency frame in the periphery of the field of view with a collimating lens disposed between the display and the planar mirror.

The mirror may be fully reflective. Alternatively the mirror may be partially reflective so as to superimpose the image of the displayed information on the scene viewed by the user through the transparency. Preferably, the reflectivity of the mirror is at least 80% to maintain a high contrast between the projected image and the scene viewed through the transparency.

Means are further provided for adjusting the optical path defined by the relative position of the mirror, the display and the user's eye to accommodate heads of various sizes. In one embodiment, the mirror is mounted on the transparency frame so that its position is adjustable. In another embodiment, the position of the mirror is fixed and the transparency frame includes adjustable temples to vary the optical path.

The display system of the present invention provides a means for displaying information to a user wearing conventional eyewear such as glasses, goggles, a dive mask, etc., as typically worn by consumers. The system is compact, unobtrusive and projects an image of the displayed information in the periphery of the user's field of view so as not to interfere with the primary activity for which the eyewear is worn. Further, the displayed information is projected at a distance from the user, the distance being selected to relate to the activity for which the eyewear is worn so that the user can rapidly correlate the displayed information with the scene viewed through the eyewear.

These and other objects, advantages and novel features of the present invention, as well as details of an illustrated embodiment thereof, will be more fully understood from the following description and the drawing.

BRIEF DESCRIPTION OF THE DRAWING

FIG. 18 is a front view of a pair of glasses utilizing the display system of the present invention with an adjustable mirror;

FIG. 19 is a rear perspective view of the glasses shown in FIG. 18;

DESCRIPTION OF THE PREFERRED EMBODIMENT

Figure 1:
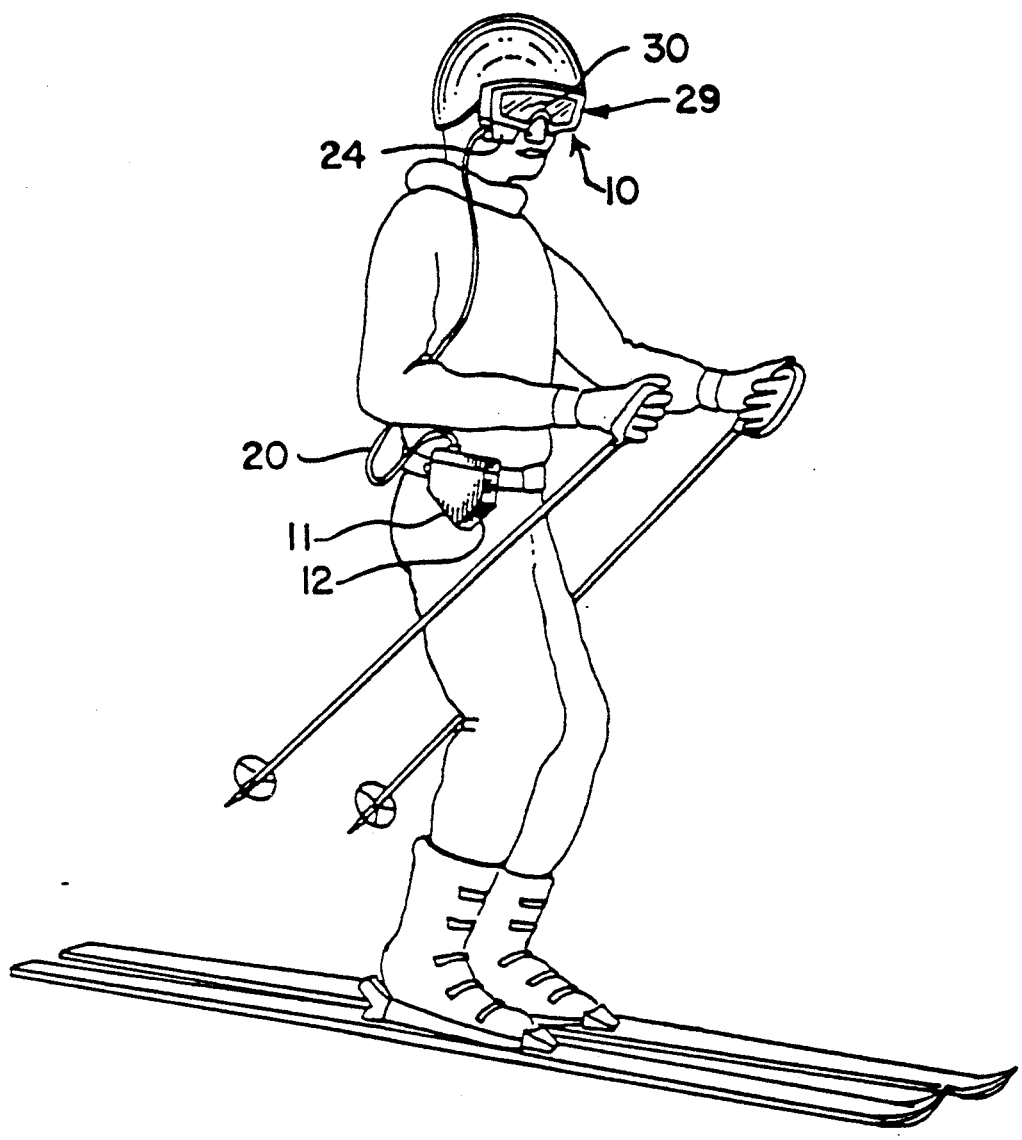
FIG. 1 is a perspective view of one embodiment of the display system for a head mounted viewing transparency in accordance with the present invention.
Figure 2:
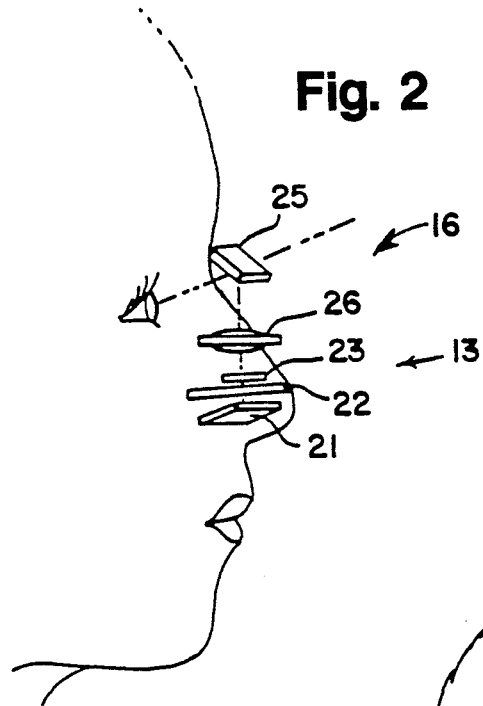
FIG. 2 is a side elevation illustrating the components of the display system shown in FIG. 1.
Figure 3:
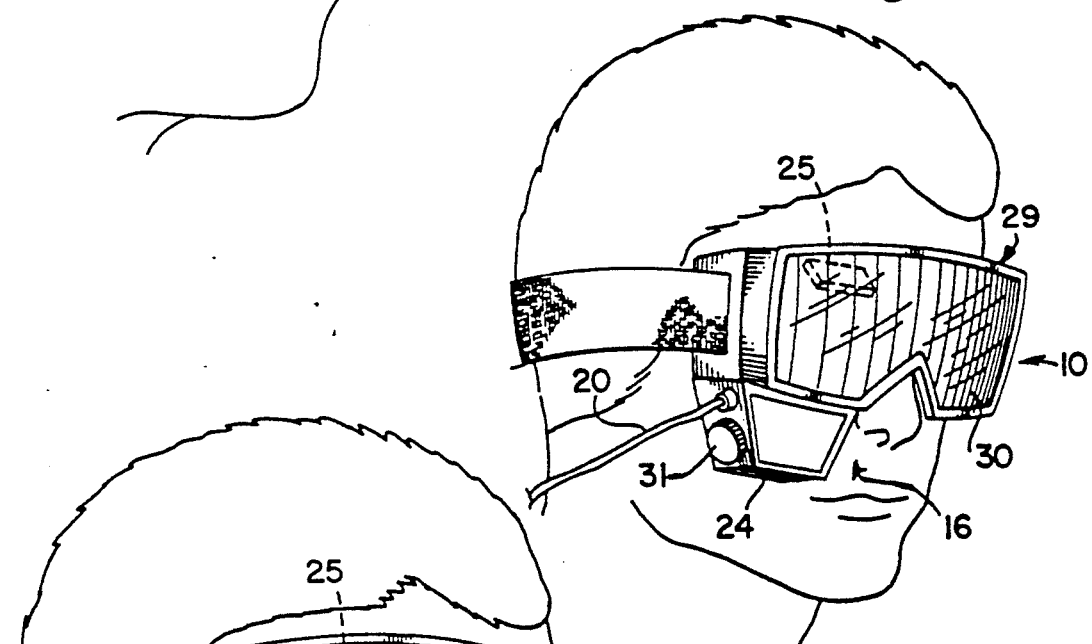
FIG. 3 is an enlarged perspective view of the display system as shown in FIG. 1.

A display system for a head mounted viewing transparency in accordance with the present invention is shown in FIGS. 1 and 3 in the form of a pair of goggles 10 worn by a skier, the ski goggles 10 having a frame 29 that supports a transparency or lens 30. The display system 16, the components of which are shown in FIG. 2 for one embodiment thereof, introduces into the periphery of the normal field of view defined by the transparency 30 a mirror 25 that at least partially reflects information so that the information may be viewed by the user. More particularly, a lens 26 positioned with respect to the mirror 25 collimates light to project an image of information or data displayed on an LCD display 13 so that it appears located at a distance from the user when viewed through the mirror 25.

The information displayed on the LCD display 13 preferably relates to the activity for which the head mounted viewing transparency is worn so that the user may rapidly correlate the displayed information with the scene viewed through the transparency 30 to aid the user in carrying out the activity. More particularly, the information displayed on the LCD display 13 and projected by the optics 25, 26 of the display system 16 may include the speed of the skier as sensed by a speed sensor 11. As shown in detail in U.S. Pat. Nos. 4,722,222 and 4,757,714, incorporated herein by reference, the sensor 11 includes an electromagnetic wave transceiver which transmits electromagnetic waves downward and forward from a leading edge portion 12 of a housing 14 of the sensor 11. Waves backscattered from the ground are received by the sensor 11 and a signal representative thereof is fed to a lowpass filter, the output of which is coupled to an analog-to-digital converter for processing by a microprocessor. The microprocessor supplies data representing the speed of the skier to the remote display system 16 via a cable 20.

As shown in FIG. 2, for the embodiment of the present invention shown in FIGS. 1 and 3, the display system 16 includes a transmissive, white, diffusing filter 21 that is exposed to ambient light. The diffusing filter 21 provides an even illumination to a backing plate 22 for a liquid crystal display plate 23 positioned adjacent to the filter 21. The liquid crystal display plate 23 preferably operates in a transmissive mode so that the protion of the display plate 23 forming the data characters is transparent, the remainder of the display plate providing a dark background for the data characters. Ambient light diffused by the filter 21 and transmitted to the liquid crystal display plate 23 through the backing plate 22 illuminates the data characters so as to provide a contrast with the dark background wherein the brighter the ambient light, the brighter the data characters. Alternatively, the display apparatus including the filter 21, backing plate 22 and liquid crystal display plate 23 may be replaced by active display elements such as light emitting diodes.

In order to increase the apparent optical distance of the image of the displayed information from the user's eye to a distance that is at least several times greater than the actual physical length of the path from the user's eye to the mirror 25 and to the display plate 23, the lens 26 is employed. The lens 26 provides an apparent optical distance that is at least ten to twelve inches (25.40 centimeters -30.48 centimeters) from the user's eye. In the preferred embodiment, the apparent optical distance between the user's eye and the projected image is selected so that it corresponds to the activity for which the eyewear is worn. More particularly, the apparent optical distance is selected to be approximately equal to the distance at which the user focuses in performing an activity. For example, because a skier typically focuses on the ground at a distance, less than infinity, in front of him, the apparent optical distance of the display system 16 is selected to be approximately equal to that focusing distance so that the skier may rapidly, visually accommodate the projected image of the displayed information while skiing.

The mirror 25 may be fully reflective. Alternatively, the mirror 25 may be semi-reflective so that the image of the projected information appears superimposed on the environment of the user as viewed through the transparency 30. In the preferred embodiment, the mirror 25 has a reflectivity of at least 80% to maintain a high contrast between the projected image of the information and the user's environment as viewed through the transparency.

As shown in FIGS. 1 and 3 the filter 21, backing plate 22 and liquid crystal display plate 23 forming the display apparatus are carried by the ski goggles 10 outside of the field of view of the user in a lower goggle extension 24. The lens 26 is also carried in the lower goggle extension 24, in an upper portion thereof abutting the frame 29. The mirror 25 is located above the user's eye in the periphery of the field of view defined by the transparency 30. In the preferred embodiment, the position of the mirror 25 is such that the look up angle is no greater than 30° so that the projected image may be easily seen. The mirror 25 may be secured to the frame 29 or directly to the transparency 30. A button 30 is further provided to send a signal to the microprocessor 20 in order to change the information depicted on the liquid crystal display plate 23.

Figure 4:
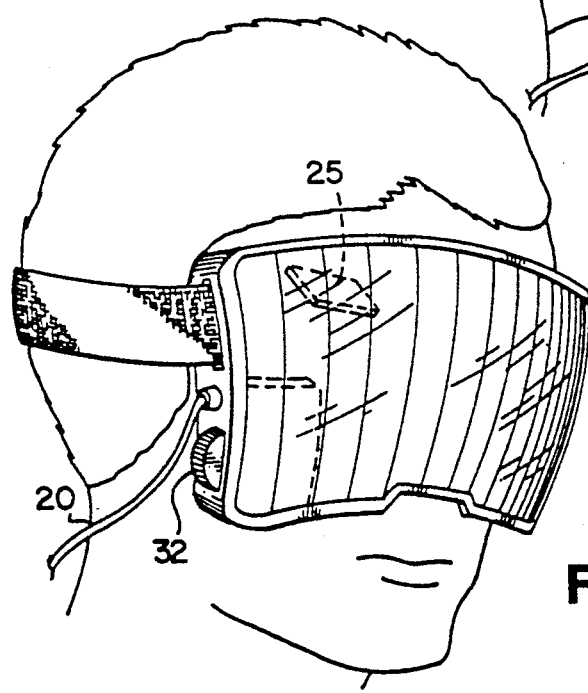
FIG. 4 is a second embodiment of the display system for a ski goggle in accordance with the present invention.

In another embodiment of the display system of the present invention as shown in FIG. 4, the filter 21, backing plate 22 and liquid crystal display plate 23 as well as the lens 26 are mounted on the goggle frame 29' within the larger transparency 30'. In this embodiment, a dial 32 is actuable by a user to select the mode and the information displayed on the liquid crystal display plate 23.

Figure 5:
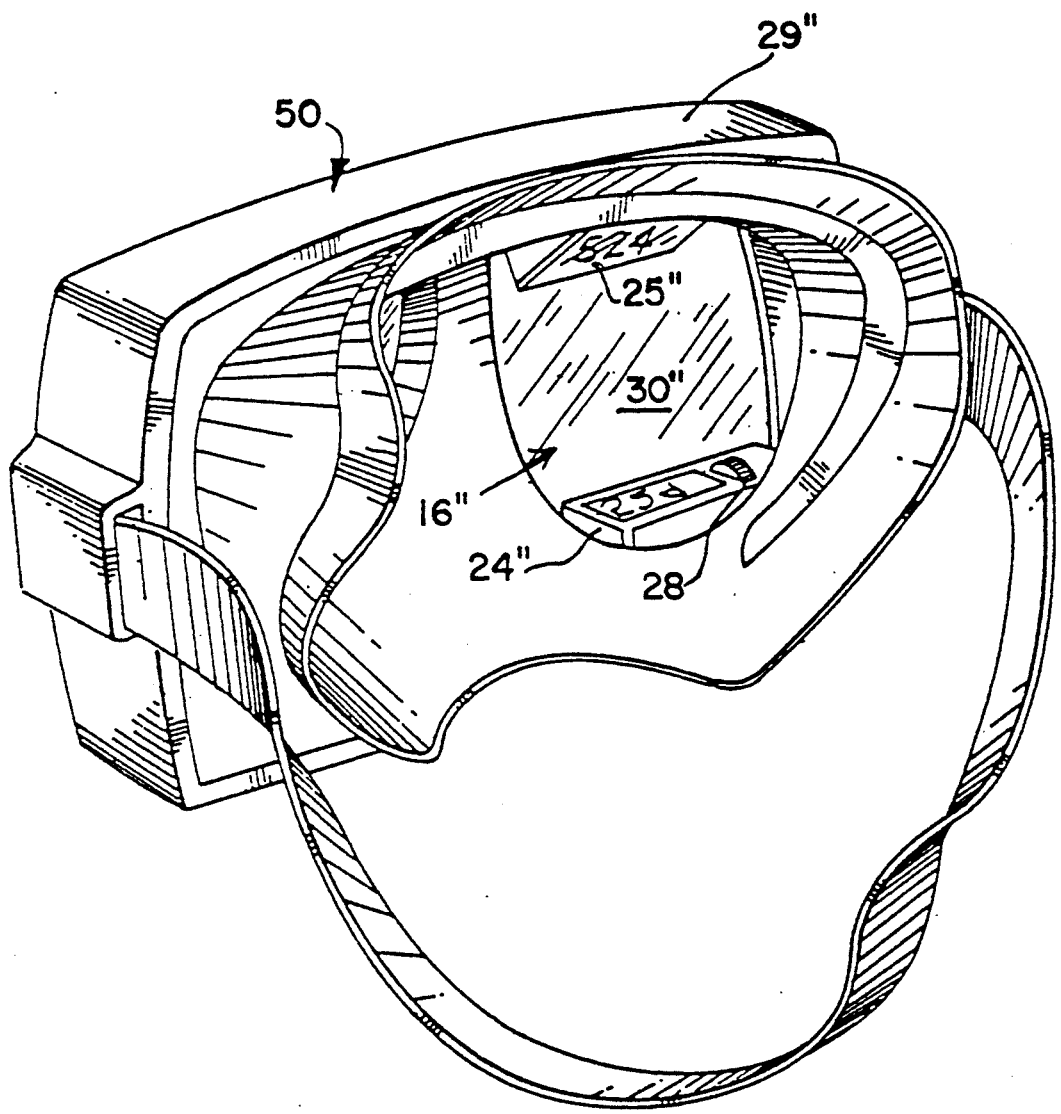
FIG. 5 is a rear perspective view of a display system for a dive mask in accordance with the present invention.

A display system for a head mounted viewing transparency in accordance with another embodiment of the present invention is shown in FIG. 5 as a dive mask 50 of the type used by scuba divers. The dive mask 50 includes a frame 29", a transparency 30", a mirror 25" and a housing 24", the housing 24" being disposed near the bottom of the dive mask adjacent to the transparency 30". In this embodiment, a dial 28 may be provided for adjusting the angle of the liquid crystal display plate 23 disposed in the housing 24". By adjusting the angle of the liquid crystal display plate 23, the optical path between the display apparatus, the mirror 25" and a user's eye may be adjusted to accommodate heads of various sizes. The information displayed on the LED display plate 23 in the housing 24" of the dive mask 50 may include, for example, the time of the remaining air supply, air tank pressure, depth of the user, the magnetic heading of the user, and temperature.

Figure 6:
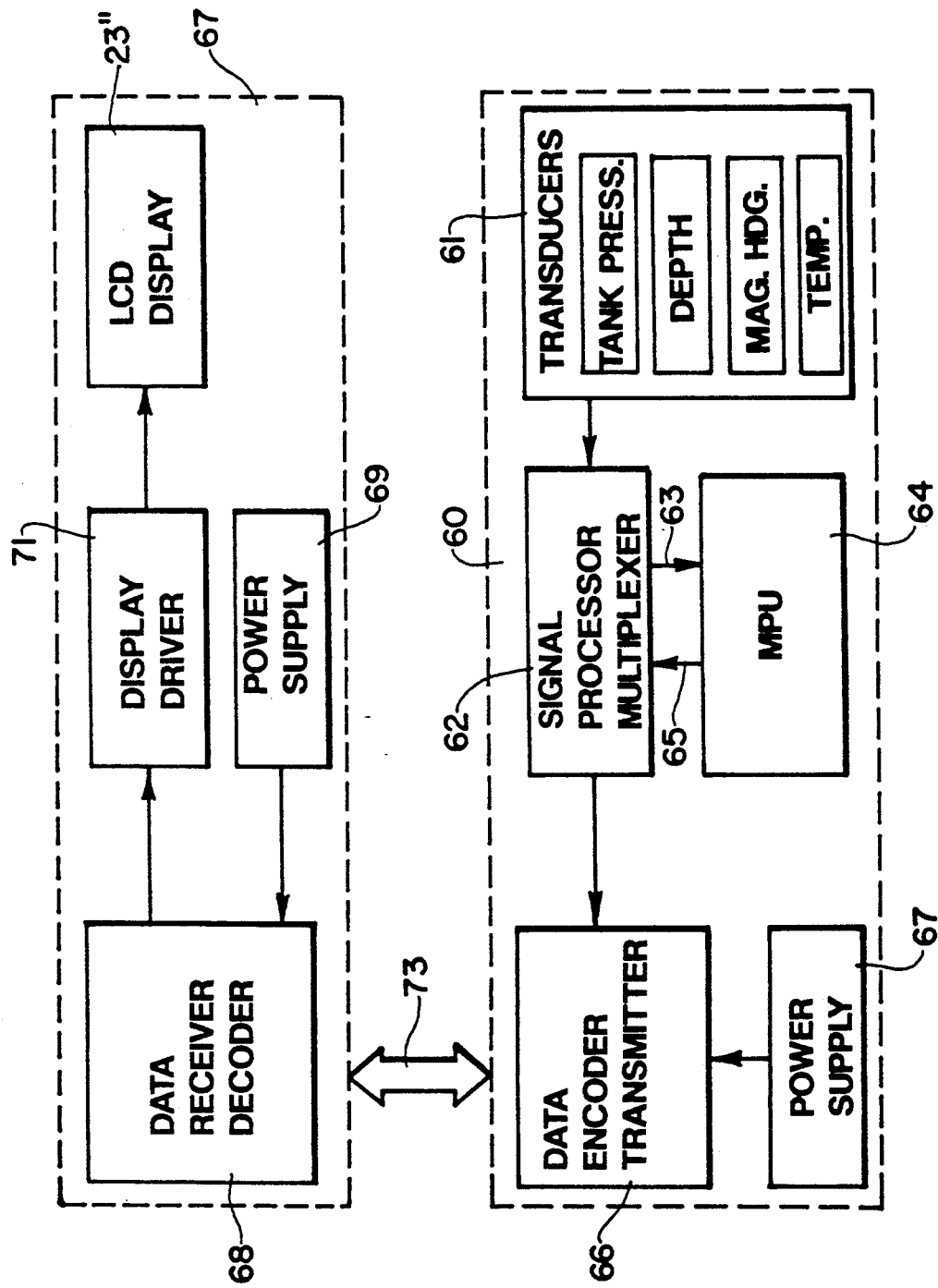
FIG. 6 is a block diagram of the data generating portion of the display system for a dive mask as shown in FIGS. 5 and 7-12.

As shown in FIG. 6, the information to be displayed by the display system 16" of the dive mask 50 is generated by a tank-coupled unit 60 having a number of transducers 61 for sensing the pressure in the user's air tank, the depth of the user, the magnetic heading of the user and the water temperature. The outputs of the transducers 61 are coupled to a signal processor multiplexer 62 that converts the analog transducer signals to digital signals that are multiplexed for insertion on a data bus 63 coupled to the a microprocessor control unit 64. The microprocessor control unit 64 processes the received information from the transducers 61 and further computes information such as absolute time, elapsed time and decompression status. This data is output on a bus 65 through the signal processor multiplexer 62 to a data encoder transmitter 66. The data encoder transmitter 66 is powered by a power supply 67 which may further power the microprocessor control unit 64. The data encoder transmitter 66 modulates the data from the microprocessor 64 using various pulse modulation techniques and transmits the modulated data via a wire link 73 to a mask coupled unit 67 contained in the housing 24" of the dive mask 50. Alternatively, a wireless acoustic or infrared device may be used to transmit the modulated data from the tank-coupled unit 60 to the mask-coupled unit 67. The modulated data received by the unit 67 is demodulated by a data receiver decoder 68 that receives power from a power supply 69. The data receiver decoder 68 outputs to a display driver 71 signals that represent the demodulated data received from the tank-coupled unit 60, the display driver 71 driving the liquid crystal display 13" to display the data thereon so that it may be viewed by the user in the mirror 25" of the dive mask 50.

Figure 7:
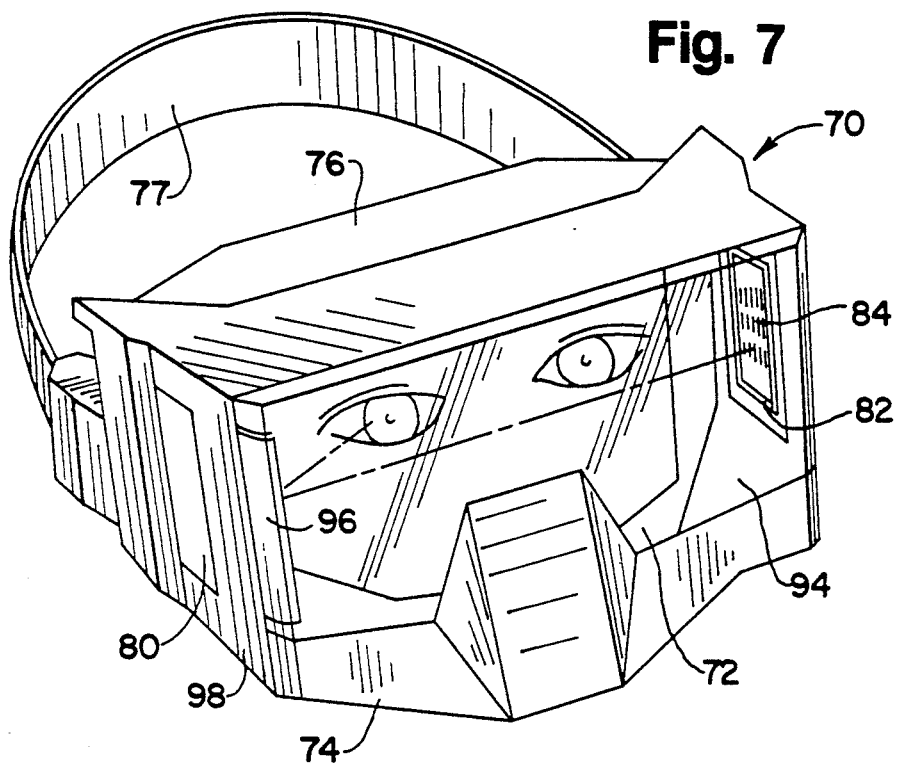
FIG. 7 is a perspective view of a second embodiment of a dive mask in accordance with the present invention.
Figure 9:
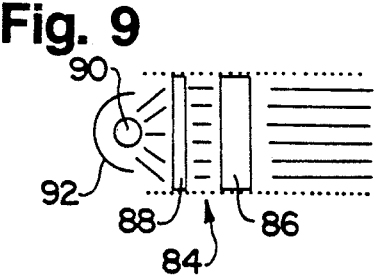
FIG. 9 is an exploded top view of the display assembly for the dive mask shown in FIGS. 7 and 8.
Figure 8:
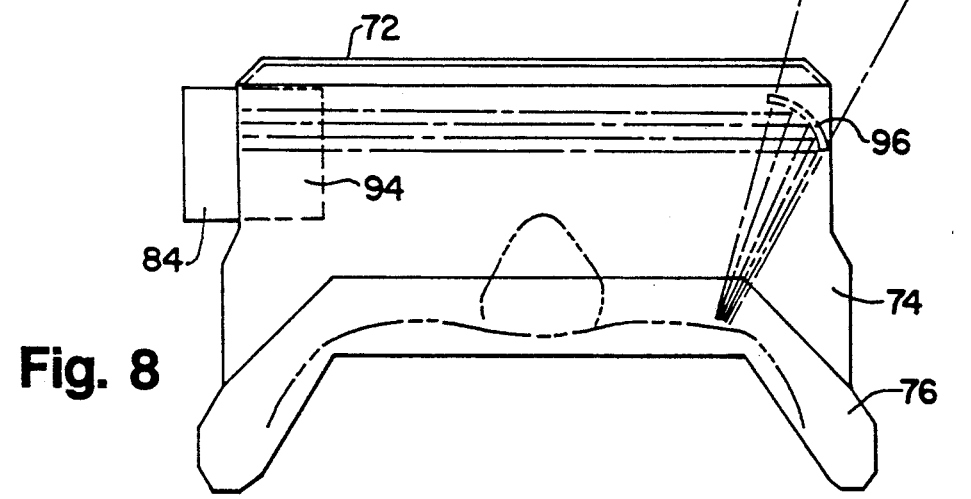
FIG. 8 is a top view of the dive mask shown in FIG. 7.

A preferred embodiment of a dive mask incorporating the display system of the present invention is shown at 70 in FIG. 7. The dive mask 70 includes a transparency 72 forming a face plate that is supported by a frame member 74. The frame member 74 is attached to a flexible skirt 76 that abuts a user's face to provide a seal therebetween. The dive mask 70 further includes a head strap or band 77 to secure the dive mask 70 to a user's head. The frame member 74 includes a pair of side windows 80 and 82 disposed on opposite sides of the frame member 74. Display apparatus 84, disposed in the side window 82 of the frame member 74, as shown in FIG. 9 includes a transparent liquid crystal display 86, operating in a light transmissive mode. A light diffuser 88 positioned adjacent to an outer surface of the display 86 distributes light from an incandescent light source 90 evenly to the display 86. A parabolic mirror 92 is provided so that all of the light from the incandescent light source 90 is directed to the light diffuser 88. In the embodiment of the dive mask 70 depicted in FIGS. 7-9, the display control apparatus 68, 69, 71 shown in FIG. 6 is disposed in a water-tight housing 94 supported by the frame member 74 and positioned beneath the display apparatus 84.

A mirror 96 is mounted to a side 98 of the frame member 74 so that the mirror 96 extends into the periphery of the field of view defined by the transparency 72 of the dive mask 70. The mirror 96 is toroidal so as to collimate light projecting an enlarged image of the information depicted on the LCD display 86 in the periphery of the field of view defined by the transparency 72 and at a distance from the user's eye of approximately one to two meters. The virtual image is such that it subtends a visual angle of approximately 5° to 15° depending on the optical approach of the user's eye. The mirror 96 may also be parabolic as discussed below or it may have a Zernike polynomial surface. Further, as discussed above, the mirror 96 is preferably partially reflective so that the image of the displayed information appears to be superimposed on the scene viewed by the user through the transparency 72. Again, the reflectivity of the mirror 96 is preferably at least 80% to maintain a high contrast between the projected image and the scene viewed through the transparency 72. The information displayed on the liquid crystal display 86 and projected by the mirror 96 may be presented in a variety of formats including a sequential display in which one parameter is displayed at a time as manually selected. Alternatively, a sequential display may be provided in which the displayed parameters are scrolled through. Further, a parallel display may be provided in which all of the information is viewed at once.

Figure 10:
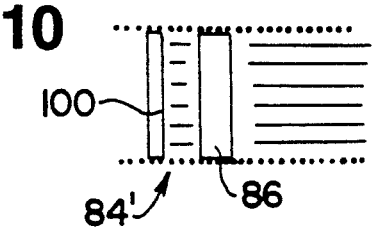
FIG. 10 is an exploded top view of a second embodiment of the display assembly for the dive mask shown in FIGS. 7 and 8.

An alternative display apparatus 84' is depicted in FIG. 10 for the dive mask 70 wherein an electroluminescent panel 100 replaces the diffuser 88 incandescent light source 90 and parabolic mirror 92. The electroluminescent panel 100 generates light that is evenly distributed to the liquid crystal display 86 to display information thereon as controlled by the display control apparatus 68, 69, 71.

Figure 11:
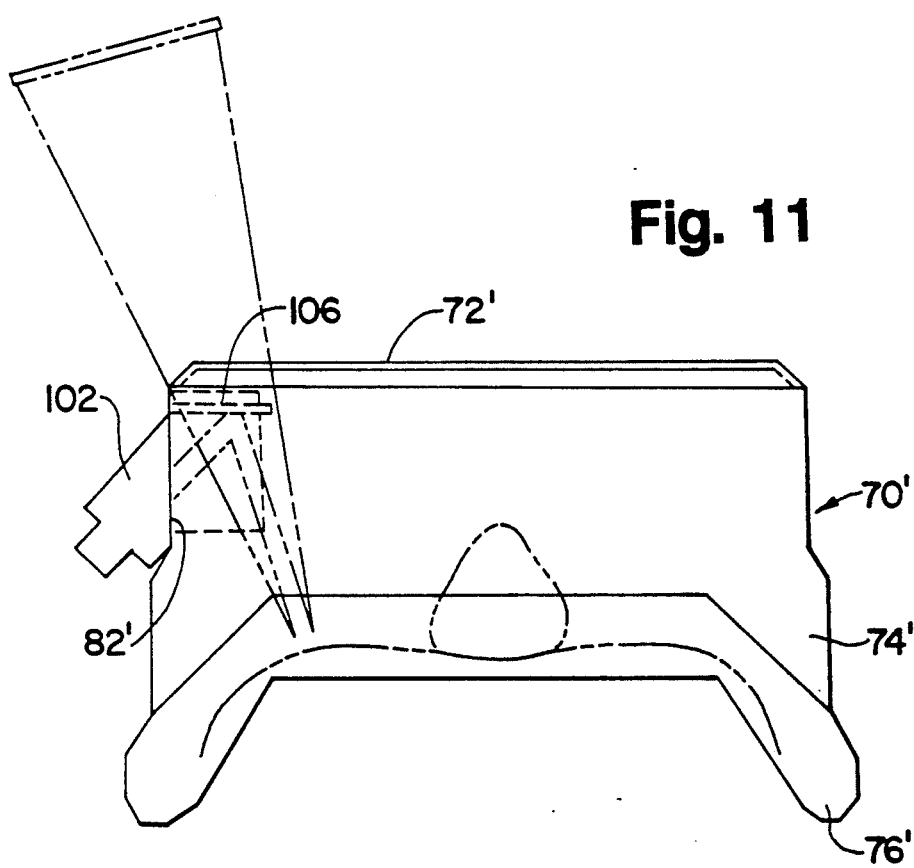
FIG. 11 is a third embodiment of a dive mask in accordance with the present invention.
Figure 12:
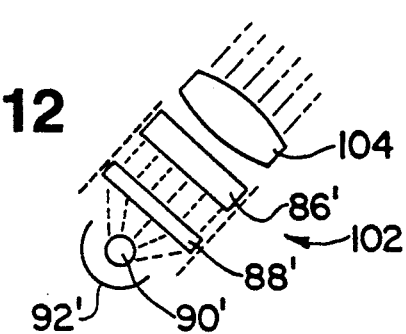
FIG. 12 is a top exploded view of the components of the display assembly for the dive mask shown in FIG. 11.

Another embodiment of the dive mask is shown at 70' in FIG. 11. In this embodiment, the display assembly 102 is angled so that light representing the information displayed on the LCD display 86' is directed towards a planar mirror 106 that extends at a right angle from a side 108 of the frame member 74' into the periphery of the field of view defined by the transparency 72'. The display assembly 102 includes a collimating lens 104 for collimating light so that the image viewed by a user looking into the planar mirror 106 appears to be enlarged and at a greater distance from the eye of the user than the length of the optical path from the user's eye to the mirror 106 and from there to the display 86'.

Figure 13:
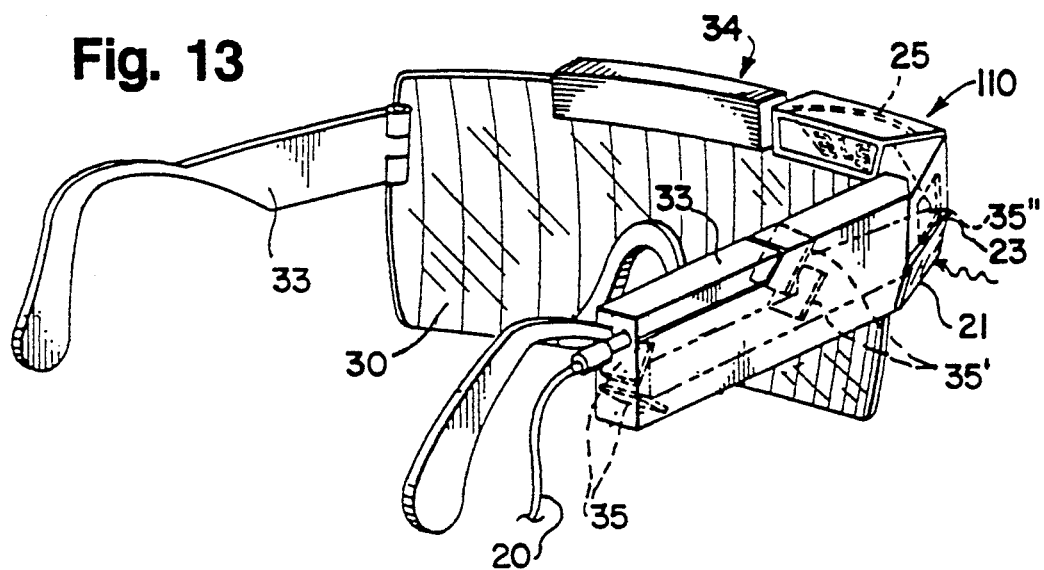
FIG. 13 is a rear perspective view of the display system for a pair of glasses in accordance with the present invention.

A further embodiment of the display system for a head mounted viewing transparency in accordance with the present invention is further depicted in FIG. 13 for a pair of sunglasses 110 having a transparency 30 supported by a frame 34 with temples 33. In this embodiment, the light diffusing filter 21 is positioned at a forward end of a temple 33 of the frame 34 with the LCD plate 23 positioned adjacent to an inner surface of the filter 21. Several planar reflectors 35, 35' and 35" are disposed within the temple 33 so as to substantially increase the length of the optical path from the liquid crystal display plate 23 to the mirror or reflector 25. In this embodiment, ambient light received by the light diffusing filter 21 passes through the light transmissive liquid crystal display plate 23. From the liquid crystal display plate 23, the light image of the data characters travels rearwardly, the length of the temple 33 to a pair of cooperating planar reflectors or mirrors 35. The top reflector 35 reflects the image of the data characters towards the front of the temple 33 to a centrally disposed pair of reflectors or mirrors 35' that are positioned to offset the reflected light upwards to a forwardly positioned mirror 35". The reflector or mirror 35" is positioned towards the top of the temple 33 at its front to direct the reflected light substantially horizontally and inwardly to the reflector or mirror 25. In this embodiment, the mirror 25 is preferably semi-reflective so as to superimpose the image of the displayed characters onto the scene viewed by the user through the transparency 30 wherein the mirror 25 is further shaped to magnify the image of the displayed characters for more convenient viewing.

The apparent optical distance of the image may also be increased by utilizing a toroidal reflector, a parabolic reflector or a reflector of other complex shape such as one having a Zernike polynomial surface shape. In the embodiment shown in FIG. 14, a horizontal section of a mirror 25" is a segment of a paraboloid for which an axial section, if more fully complete, would continue along the broken line path 40. The reflector surface preferably is a three-dimensional concave segment of the paraboloid formed by rotation of a parabola 40 about the horizontal axis 41. The relative position of the mirror 25" and a liquid crystal display plate 42 mounted on a temple 33' of the eyewear 34' is such that the axis 41 of revolution of the parabola 40 from which the segment of the mirror 25' is taken, intersects or is closely adjacent to the liquid crystal display plate 42. Preferably, the parabolic focus 43 of the mirror 25' is close to the liquid crystal display plate 42 but opposite it from the imaginary apex of the paraboloid, in which case the optical distance at which the user's eye will focus, is very long, i.e., at least several times the actual length of the path from the eye to the reflector and then to the liquid crystal display plate 42.

Figure 14:
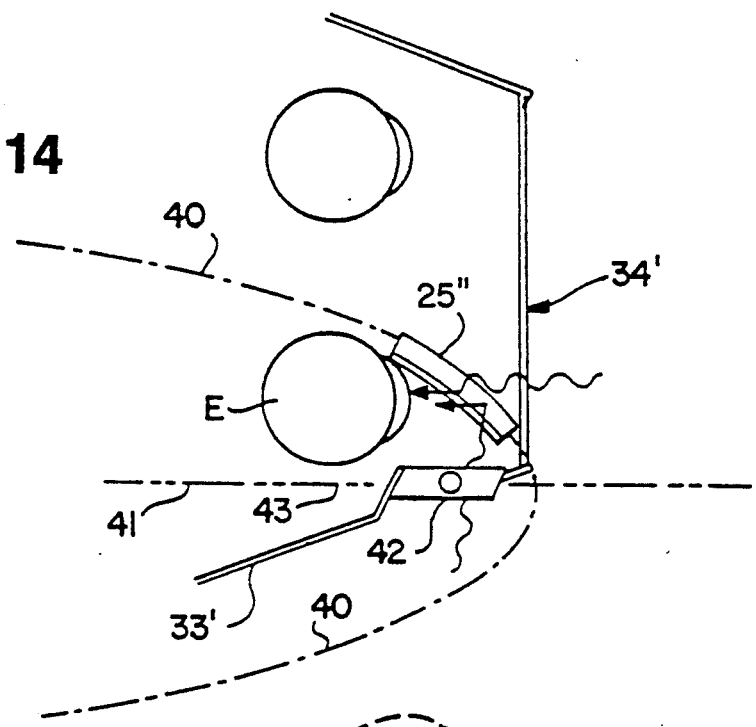
FIG. 14 is a top plan view of a second embodiment of a display system in accordance with the present invention utilizing a segment of a parabolic reflector.
Figure 15:
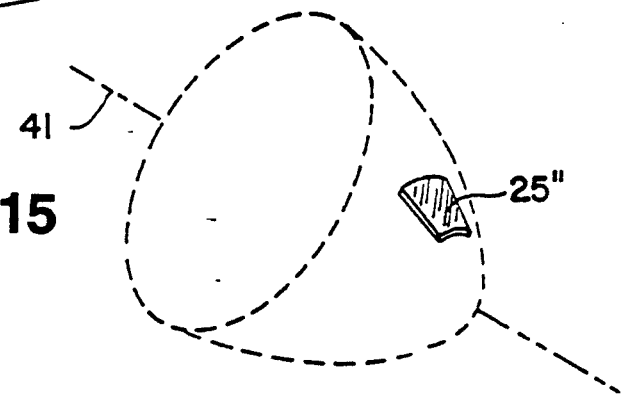
FIG. 15 is a perspective view of the parabolic reflector shown in FIG. 14.

It is noted that in the embodiment shown in FIG. 14, the reflector 25" covers the entire field of view of a user's eye so that the reflector 25" must be at least partially transparent to enable the user to view his environment through the reflector 25". In this embodiment, the image of the data displayed on the liquid crystal display plate 42 is projected so as to be superimposed on the user's environment, and not necessarily in the periphery of the field of view defined by the eyewear 34'.

Figure 16:
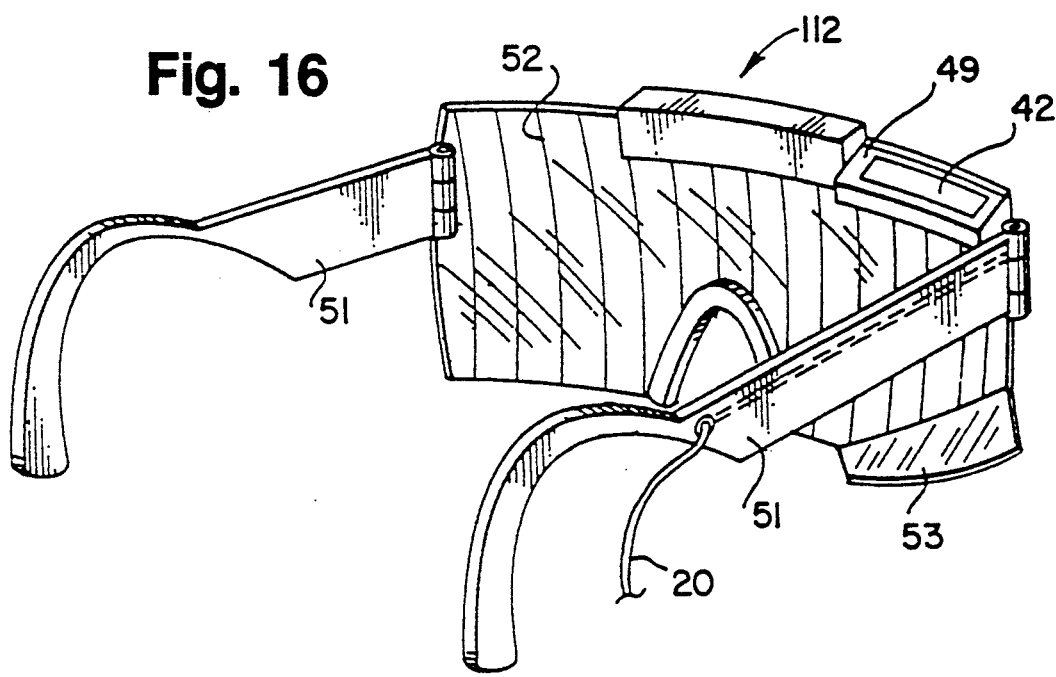
FIG. 16 is a rear perspective view of a third embodiment of the display system for a pair of glasses in accordance with the present invention.
Figure 17:
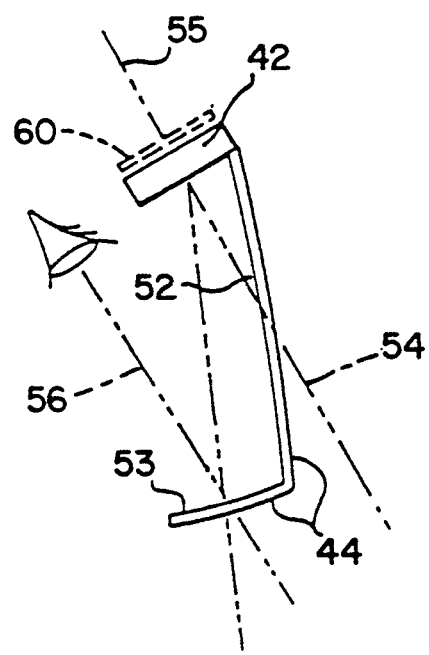
FIG. 17 is an elevational view of the components of the display system shown in FIG, 16.

A still further embodiment of the display system of the present invention, depicted for a pair of glasses 112, is shown in FIGS. 16 and 17 wherein the reflector or mirror 53 forms a bifocal lens with the transparency 52 of the glasses 112. The liquid crystal display plate 42 is mounted on an upper portion of a frame 49 of the glasses 112 wherein the display is coupled to a remote control via the line 20 as depicted in FIG. 1 such that the line 20 is housed in one of the temples 51 of the glasses 112.

As seen in FIG. 17, the bifocal reflector portion 53 of the transparency 52 projects inwardly from the transparency 52 and is preferably formed as a segment of a paraboloid having an axis 54 and focus 55 wherein the axis 54 intersects approximately the center of the liquid crystal display plate 42 and is approximately parallel to the path 56 from the eye to the center of the reflector portion 53. The focus 55 is close to the liquid crystal display plate 52 but opposite the plate 42 from the imaginary apex of the paraboloid. Further, the liquid crystal display plate 42 is preferably mounted approximately perpendicular to the axis 54 so that it is canted downward from the upper portion of the lens 52 towards the eye at a small acute angle. This configuration results in a projected image of the displayed information that is magnified and appears at a long distance from the eye for easy focusing in the peripheral field of view.

The visibility of the projected image may be increased by employing a color-compensating filter material incorporated into the lens 52. Alternatively, the color-compensating filter material may be formed as a sheet 44 disposed on the outer surface of the lens 52 and the bifocal mirror portion 53. The visual effect of the color-compensating filter is to enhance or remove color components of the background that are different from the color components of the reflected characters. As shown in FIG. 17, the image projected by the display system will be bright and easily viewable when ambient light is primarily directed downward from above the eyewear 112. Where a substantial portion of ambient light is generated and directed or reflected from below the eyewear 112, light passing through the bifocal reflector portion 53 may reduce the contrast of the characters displayed on the liquid crystal display 42 against the dark background of the display 42. In order to obviate this problem, the reflector 53 may be made total reflective. Alternatively, a totally reflective mirror 60 may be positioned as shown in broken lines in FIG. 17 above the liquid crystal display plate 42. The amount of light passing upward through the liquid crystal display plate and reflected downwardly by the mirror 60 will be approximately the same or greater than the light passing upward through the partially transmissive reflector 53 so that a constant contrast is obtained for different lighting conditions.

Figure 22:
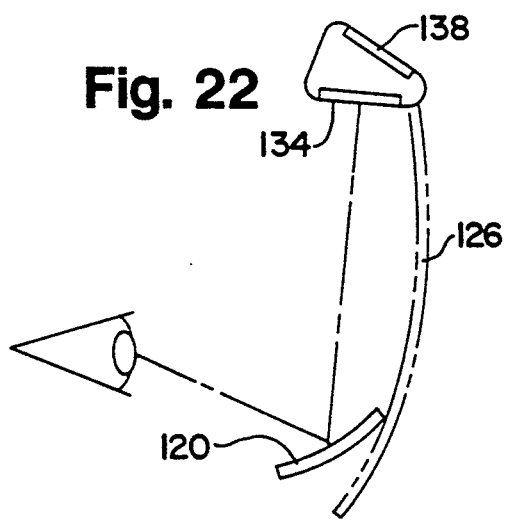
FIG. 22 is an illustration of one optical path for the glasses shown in FIGS. 18-21.
Figure 23:
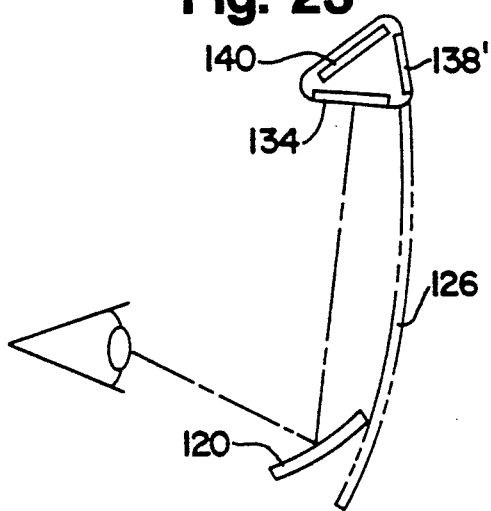
FIG. 23 is an illustration of a second optical path for the glasses depicted in FIGS. 18-21.

In the embodiments of the present invention depicted in FIGS. 18-21, the optical path defined by the relative position of the reflector or mirror, liquid crystal display and user's eye is made adjustable so as to accommodate heads of various sizes. In one embodiment, as shown in FIGS. 18 and 19, a mirror 120 is adjustably mounted on a nosepiece 122 forming a portion of the frame 124 of a pair of glasses wherein the mirror 120 extends into the periphery of the field of view defined by the transparency 126 of the glasses. More particularly, a shaft 128 extends outwardly from the nosepiece 122. The mirror 120 includes a counterbore in which the shaft 128 is received so that the mirror 120 may pivot thereabout. A set screw 130 is provided so as to firmly maintain the position of the mirror 120 after it is adjusted to accommodate the user. In this embodiment, the mirror 120 is preferably toroidal and semi-reflective having a reflectivity of at least 80% as discussed above. As shown in FIGS. 22 and 23, a light transmissive liquid crystal display is mounted in a portion 136 of the frame 124 directly above the mirror 120. In the embodiment of FIG. 22, the light transmissive liquid crystal display 134 receives ambient light directly from a light diffuser 138 that is mounted on the frame portion 136 at an angle with respect to the horizontal plane of the liquid crystal display 134 so as to receive ambient light from above the frame portion 136. In the embodiment shown in FIG. 23, the liquid crystal display plate 134 receives ambient light that is reflected thereto by a fully reflective mirror 140 positioned so as to receive light from a light diffuser 138' that is positioned at an angle approaching 90° with respect to the horizontal. In the embodiment depicted in FIG. 23, the light diffuser 138' transmits ambient light received from a direction forward of the transparency 126 so that the eyewear may be used with hats, caps, or the like, having visors which would shade the light diffuser 138 shown in FIG. 22.

Figure 20:
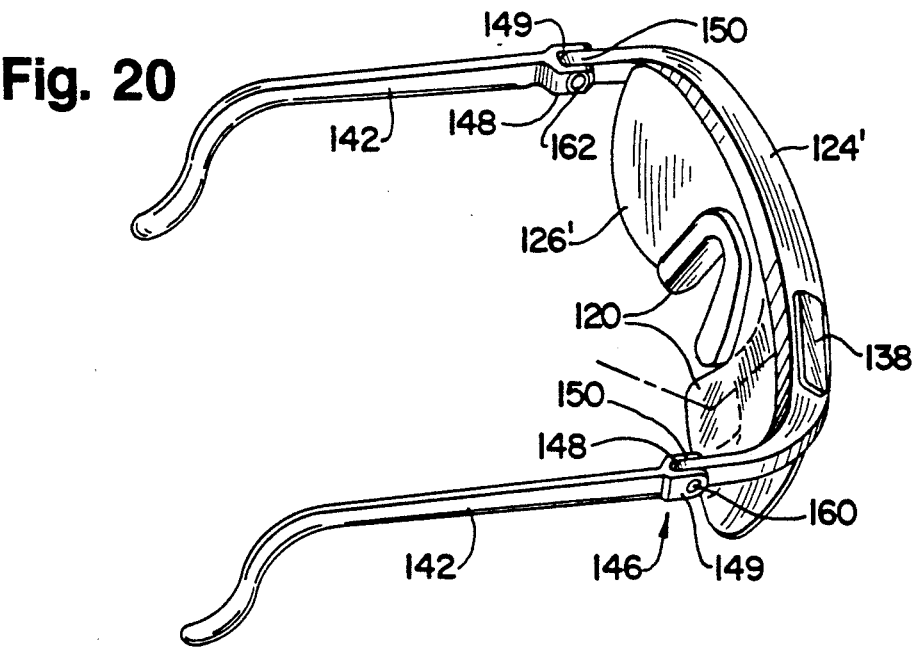
FIG. 20 is a side perspective view of another embodiment of a pair of glasses utilizing the display system of the present invention having a bifocal lens and adjustable temples.
Figure 21:
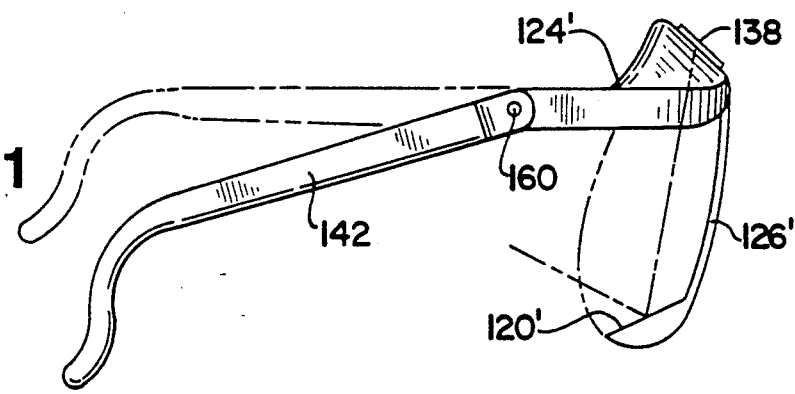
FIG. 21 is a side view of the glasses shown in FIG. 20.

In a second embodiment of the present invention providing an adjustable optical path, as shown in FIGS. 20 and 21, the temples 142 of the frame 124 are made adjustable whereas the position of the mirror 120' is made fixed. The mirror 120' is formed as a bifocal with the lens or transparency 126'. In the preferred embodiment, the mirror 120' is toroidal in shape having a reflectivity of at least 80% to project an enlarged image of the information depicted on the display 134 in the periphery of the field of view defined by the transparency 126' and at a selected distance from the user.

In order to adjust the optical path defined by the relative position of the mirror 120', the display 134 and the user's eye, the temples 142 may be angled upwardly or downwardly from the horizontal as depicted in FIG. 21. Each of the temples 142 is formed having a forked end 146 with a pair of parallel flanges 148 and 149 spaced so as to receive a flanged portion 150 of the frame 124 therebetween. The temples 142 pivot about an axis through which a shaft 160 extends wherein a set screw 162 or the like may be disposed on the inner flange 148 so as to fix the position of the temples 142 after they have been adjusted. Alternatively, the temples 142 may be made ratcheting so that the temples 142 automatically lock into position after they are adjusted.

It is noted that for the embodiments of the eye glasses depicted in FIGS. 18-23, the display driver electronics are housed in the upper portion 136 of the frame 124. Depending upon the application, a transducer or sensor and microprocessor may also be housed in the frame 124. Alternatively, the transducer and microprocessor may be disposed remote from the display apparatus, the data to be displayed being transmitted via a line 20 extending, as shown in FIG. 13, through the frame 124. Alternatively a wireless acoustic or infrared coupling may be employed to transmit the data to the display driver electronics.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A display system for a head mounted viewing transparency, said transparency defining a field of view for a user comprising:
   means for supporting said transparency to mount said transparency on a user's head;
   means for displaying information, said display means being mounted on said support means; and
   mirror means for collimating light to project an image of said displayed information at a distance from said user in the periphery of said field of view, said mirror means receiving said information directly from said display means and being positioned in the periphery of said field of view to allow said user to view said image through said mirror means.

2. A display system for a head mounted viewing transparency as recited in claim 1 wherein said mirror means is partially reflective.

3. A display system for a head mounted viewing transparency as recited in claim 2 wherein the reflectivity of said mirror means is at least 80% to maintain a high contrast between the projected image of said displayed information and a scene viewed through said transparency.

4. A display system for a head mounted viewing transparency as recited in claim 1 wherein said mirror means is fully reflective.

5. A display system for a head mounted viewing transparency as recited in claim 1 wherein said mirror means includes a toroidal mirror that is at least partially reflective to project said image.

6. A display system for a head mounted viewing transparency as recited in claim 1 wherein said mirror means includes a Zernike polynomial surface that is at least partially reflective to project said image.

7. A display system for a head mounted viewing transparency as recited in claim 1 wherein said mirror means has a parabolic surface that is at least partially reflective to project said image.

8. A display system for head mounted viewing transparency as recited in claim 1 wherein said mirror means projects said image of displayed information at infinity.

9. A display system for head mounted viewing transparencies as recited in claim 1 wherein said mirror means projects said image of displayed information at a distance that is less than infinity to allow a user to rapidly visually accommodate said image while performing an activity requiring focusing at less than infinity.

10. A display system for a head mounted viewing transparency as recited in claim 1 wherein said mirror means is shaped to project a magnified image of said displayed information.

11. A display system for a head mounted viewing transparency as recited in claim 1 wherein said display means transmits light to said mirror means, said system further including color filtering means for removing color components of the environment viewed through said transparency, said removed color components being different from the color components of the light transmitted from said display means.

12. A display system for a head mounted viewing transparency as recited in claim 11 wherein said color filtering means is disposed on an outer surface of said viewing transparency.

13. A display system for a head mounted viewing transparency as recited in claim 1 wherein said head mounted viewing transparency forms a pair of glasses, said support means forming the frame of said glasses.

14. A display system for a head mounted viewing transparency as recited in claim 13 wherein said mirror means is mounted on said frame.

15. A display system for a head mounted viewing transparency as recited in claim 14 including means for adjustably mounting said mirror on said frame to vary the optical path defined by the relative position of said mirror means, said display and a user's eye so as to accommodate heads of various sizes.

16. A display system for a head mounted viewing transparency as recited in claim 13 wherein the position of said mirror means is fixed and said frame includes adjustable temples to vary the optical path defined by the relative position of said mirror means, said display and a user's eye so as to accommodate heads of various sizes.

17. A display system for a head mounted viewing transparency as recited in claim 16 wherein said frame includes a nosepiece and said mirror means is mounted on said nosepiece.

18. A display system for a head mounted viewing transparency as recited in claim 16 wherein said mirror means and said viewing transparency form a bifocal.

19. A display system for a head mounted viewing transparency as recited in claim 1 wherein said mirror means and said viewing transparency form a bifocal.

20. A display system for a head mounted viewing transparency as recited in claim 1 wherein said head mounted viewing transparency forms a goggle.

21. A display system for a head mounted viewing transparency as recited in claim 1 wherein said head mounted viewing transparency forms a mask, said support means having a frame member extending about the periphery of said transparency for supporting said viewing transparency and a flexible member extending about the periphery of said frame member, said flexible member conforming to contours of the user's face to provide a seal therewith.

22. A display system for a head mounted viewing transparency as recited in claim 1 wherein said support means includes a helmet and said transparency forms a visor for said helmet.

23. A display system for a head mounted viewing transparency as recited in claim 1 wherein said display means includes a light transmissive display.

24. A display system for a head mounted viewing transparency as recited in claim 23 wherein said display is a liquid crystal display.

25. A display system for a head mounted viewing transparency as recited in claim 23 wherein said display means includes a light diffuser disposed on a side of said transmissive display opposite said mirror means said diffuser providing even illumination to said transmissive display.

26. A display system for a head mounted viewing transparency as recited in claim 25 wherein said light diffuser receives ambient light for even distribution to said display.

27. A display system for a head mounted viewing transparency as recited in claim 26 includes means for reflecting light from said diffuser to said display.

28. A display system for a head mounted viewing transparency as recited in claim 25 including an incandescent light source positioned adjacent a side of said light diffuser opposite to the side of said light diffuser that is positioned adjacent to said transmissive display.

29. A display system for a head mounted viewing transparency as recited in claim 28 further including a parabolic mirror positioned to direct the light from said incandescent light source to said light diffuser.

30. A display system for a head mounted viewing transparency as recited in claim 28 including an electroluminescent panel disposed adjacent the side of said transmissive display opposite the side of said display facing said mirror means.

31. A display system for a head mounted viewing transparency said transparency defining a field of view for a user comprising:
   means for supporting said transparency to mount said transparency on a user's head;
   means for displaying information, said display means being mounted on said support means to integrate said display means into said support means;
   mirror means disposed in the periphery of said field of view at a position relative to said display means for collimating light to project an image of said displayed information at a distance from said user; and
   means for adjusting an optical path defined by the relative position of said mirror means, said display means and an eye of the user to accommodate heads of various sizes.

32. A display system for a head mounted viewing transparency as recited in claim 31 including means for adjustably mounting said mirror on said support means to vary the optical path defined by the relative position of said mirror means, said display and a user's eye so as to accommodate heads of various sizes.

33. A display system for a head mounted viewing transparency as recited in claim 31 wherein the position of said mirror means is fixed and said support means includes adjustable temples to vary the optical path defined by the relative position of said mirror means, said display and a user's eye so as to accommodate heads of various sizes.

34. A display system for a head mounted viewing transparency as recited in claim 33 wherein said support means includes a nosepiece and said mirror means is mounted on said nosepiece.

35. A display system for a head mounted viewing transparency as recited in claim 33 wherein said mirror means and said viewing transparency form a bifocal.

36. A display system for a head mounted viewing transparency as recited in claim 31 wherein said mirror means and said viewing transparency form a bifocal.

37. A display system for a head mounted viewing transparency as recited in claim 31 wherein said mirror means is partially reflective.

38. A display system for a head mounted viewing transparency as recited in claim 37 wherein the reflectivity of said mirror means is at least 80% to maintain a high contrast between the projected image of said displayed information and a scene viewed through said transparency.

39. A display system for a head mounted viewing transparency as recited in claim 33 wherein said mirror means includes a toroidal mirror that is at least partially reflective to project said image.

40. A display system for a head mounted viewing transparency as recited in claim 31 wherein said mirror means includes a Zernike polynomial surface that is at least partially reflective to project said image.

41. A display system for a head mounted viewing transparency as recited in claim 31 wherein said mirror means has a parabolic surface that is at least partially reflective to project said image.

42. A display system for head mounted viewing transparencies as recited in claim 31 wherein said mirror means projects said image of displayed information at a distance that is less than infinity to allow a user to rapidly visually accommodate said image while performing an activity requiring focusing at less than infinity.

43. A display system for a head mounted viewing transparency as recited in claim 31 wherein said mirror means is shaped to project a magnified image of said displayed information.

44. A display system for a head mounted viewing transparency as recited in claim 31 wherein said display means transmits light to said mirror means, said system further including color filtering means for removing color components of the environment viewed through said transparency, said removed color components being different from the color components of the light transmitted from said display means.

45. A display system for a head mounted viewing transparency as recited in claim 41 wherein said color filtering means is disposed on an outer surface of said viewing transparency.

46. A display system for a head mounted viewing transparency as recited in claim 31 wherein said display means includes a light transmissive display.

47. A display system for a head mounted viewing transparency as recited in claim 46 wherein said display is a liquid crystal display.

48. A display system for a head mounted viewing transparency as recited in claim 46 wherein said display means includes a light diffuser disposed on a side of said transmissive display opposite said mirror means said diffuser providing even illumination to said transmissive display.

49. A display system for a head mounted viewing transparency as recited in claim 48 wherein said light diffuser receives ambient light for even distribution to said display.

50. A display system for a head mounted viewing transparency as recited in claim 49 includes means for reflecting light from said diffuser to said display.

51. A display system for a head mounted viewing transparency as recited in claim 48 including an incandescent light source positioned adjacent a side of said light diffuser opposite to the side of said light diffuser that is positioned adjacent to said transmissive display.

52. A display system for a head mounted viewing transparency as recited in claim 51 further including a parabolic mirror positioned to direct the light from said incandescent light source to said light diffuser.

53. A display system for a head mounted viewing transparency as recited in claim 46 including an electroluminescent panel disposed adjacent the side of said transmissive display opposite the side of said display facing said mirror means.

54. A display system for a head mounted viewing transparency used in performing an activity that in part requires focusing at a distance that is less than infinity, said transparency defining a field of view comprising:
means for supporting said transparency to mount said transparency on a user's head;
means for displaying information, said display means being mounted on said support means; and
mirror means disposed in the periphery of said field of view for collimating light to project an image of said displayed information in the periphery of said field of view and at a distance from said user that is less than infinity to allow a user to rapidly, visually accommodate said projected image while performing said activity part.

55. A display system for a head mounted viewing transparency as recited in claim 54 wherein said mirror means is partially reflective.

56. A display system for a head mounted viewing transparency as recited in claim 55 wherein the reflectivity of said mirror means is at least 80% to maintain a high contrast between the projected image of said displayed information and the environment of the user as viewed through said transparency.

57. A display system for a head mounted viewing transparency as recited in claim 54 wherein said mirror means includes a toroidal mirror that is at least partially reflective to project said image.

58. A display system for a head mounted viewing transparency as recited in claim 54 wherein said mirror means includes a Zernike polynomial surface that is at least partially reflective to project said image.

59. A display system for a head mounted viewing transparency as recited in claim 54 wherein said mirror means has a parabolic surface that is at least partially reflective to project said image.

60. A display system for a head mounted viewing transparency as recited in claim 51 wherein said mirror means is shaped to project a magnified image of said displayed information.

61. A display system for a head mounted viewing transparency as recited in claim 54 wherein said display means transmits light to said mirror means, said system further including color filtering means for removing color components of the environment viewed through said transparency, said removed color components being different from the color components of the light transmitted from said display means.

62. A display system for a head mounted viewing transparency as recited in claim 61 wherein said color filtering means is disposed on an outer surface of said viewing transparency.

63. A display system for a head mounted viewing transparency as recited in claim 54 wherein said head mounted viewing transparency forms a pair of glasses, said support means forming the frame of said glasses.

64. A display system for a head mounted viewing transparency as recited in claim 54 wherein said head mounted viewing transparency forms a goggle.

65. A display system for a head mounted viewing transparency as recited in claim 54 wherein said head mounted viewing transparency forms a mask, said support means having a frame member extending about the periphery of said transparency for supporting said viewing transparency and a flexible member extending about the periphery of said frame member said flexible member conforming to contours of the user's face to provide a seal therewith.

66. A display system for a head mounted viewing transparency as recited in claim 54 wherein said support means includes a helmet and said transparency forms a visor for said helmet.

67. A display system for a head mounted viewing transparency as recited in claim 54 wherein said display means includes a light transmissive display.

68. A display system for a head mounted viewing transparency as recited in claim 67 wherein said display is a liquid crystal display.

69. A display system for a head mounted viewing transparency as recited in claim 67 wherein said display means includes a light diffuser disposed on a side of said transmissive display opposite said mirror means said diffuser providing even illumination to said transmissive display.

70. A display system for a head mounted viewing transparency as recited in claim 69 wherein said light diffuser receives ambient light for even distribution to said display.

71. A display system for a head mounted viewing transparency as recited in claim 70 includes means for reflecting light from said diffuser to said display.

72. A display system for a head mounted viewing transparency as recited in claim 69 including an incandescent light source positioned adjacent a side of said light diffuser opposite to the side of said light diffuser that is positioned adjacent to said transmissive display.

73. A display system for a head mounted viewing transparency as recited in claim 72 further including a parabolic mirror positioned to direct the light from said incandescent light source to said light diffuser.

74. A display system for a head mounted viewing transparency as recited in claim 69 including an electroluminescent panel disposed adjacent the side of said transmissive display opposite the side of said display facing said mirror means.

75. A display system for conventional eyewear having at least one viewing transparency and a frame, said viewing transparency defining a field of view comprising:
means for displaying information mounted on said frame; and
means for collimating light to project an enlarged image of said displayed information at a distance from said user said collimating means receiving said information directly from said display means and including a single reflector through which said 76. A display system for conventional eyewear as recited in claim 75 wherein said eyewear forms a pair of glasses.

77. A display system for conventional eyewear as recited in claim 75 wherein said eyewear forms a pair of goggles.

78. A display system for conventional eyewear as recited in claim 75 wherein said eyewear forms a mask.

79. A display system as recited in claim 75 wherein said reflector includes a planar mirror mounted on said frame; and said collimating means includes a collimating lens disposed between said display means and said planar mirror for receiving said information directly from said display means.

80. A display system as recited in claim 75 wherein said collimating means includes a toroidal mirror and said display means includes a light transmissive display and a light diffuser positioned adjacent to a side of said display opposite said mirror.

81. A display system for conventional eyewear as recited in claim 80 wherein said light diffuser receives ambient light for even distribution to said display.

82. A display system for conventional eyewear as recited in claim 81 includes means for reflecting light from said diffuser to said display.

83. A display system for conventional eyewear as recited in claim 80 including an incandescent light source positioned adjacent a side of said light diffuser opposite to the side of said light diffuser that is positioned adjacent to said transmissive display.

84. A display system for conventional eyewear as recited in claim 83 further including a parabolic mirror positioned to direct the light from said incandescent light source to said light diffuser.

85. A display system for conventional eyewear as recited in claim 75 wherein said display means includes a light transmissive display and an electroluminescent panel disposed adjacent a side of said transmissive display.

86. A display system for conventional eyewear as recited in claim 75 wherein said collimating means includes a toroidal mirror.

87. A display system for conventional eyewear as recited in claim 75 wherein said collimating means includes a parabolic mirror.

88. A display system for conventional eyewear as recited in claim 75 wherein said collimating means includes a Zernike polynomial surface that is at least partially reflective to project said image.

89. A display system for a head mounted viewing transparency as recited in claim 75 wherein said mirror means is shaped to project a magnified image of said displayed information.

90. A display system for a head mounted viewing transparency as recited in claim 75 wherein said display means transmits light to said mirror means, said system further including color filtering means for removing color components of the environment viewed through said transparency, said removed color components being different from the color components of the light transmitted from said display means.

91. A display system for a head mounted viewing transparency as recited in claim 90 wherein said color filtering means is disposed on an outer surface of said viewing transparency.

92. A display system for a head mounted viewing transparency as recited in claim 75 wherein said collimating means includes a mirror and means for adjustably mounting said mirror on said frame to vary the optical path defined by the relative position of said mirror means, said display and a user's eye so as to accommodate heads of various sizes.

93. A display system for a head mounted viewing transparency as recited in claim 75 wherein said collimating means includes a mirror the position of which is fixed and said frame includes adjustable temples to vary the optical path defined by the relative position of said mirror means, said display and a user's eye so as to accommodate heads of various sizes.

94. A display system for a head mounted viewing transparency as recited in claim 75 wherein said mirror means and said viewing transparency form a bifocal.

* * * * *

UNITED STATES PATENT AND TRADEMARK OFFICE
CERTIFICATE OF CORRECTION

PATENT NO. : 5,162,828

DATED : November 10, 1992

INVENTOR(S) : Thomas A. Furness, et al.

It is certified that error appears in the above-identified patent and that said Letters Patent is hereby corrected as shown below:

Column 15, line 50, after "said" insert --image is viewed.--.

Signed and Sealed this

Thirteenth Day of April, 1993

Attest:

STEPHEN G. KUNIN

*Attesting Officer*     *Acting Commissioner of Patents and Trademarks*

UNITED STATES PATENT AND TRADEMARK OFFICE
CERTIFICATE OF CORRECTION

PATENT NO.   :   5,162,828
DATED        :   November 10, 1992
INVENTOR(S)  :   Furness et al.

It is certified that error appears in the above-identified patent and that said Letters Patent is hereby corrected as shown below:

Column 15, line 50, after "said" insert --image is viewed.--.

Signed and Sealed this

Twenty-third Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.    : 5,162,828
DATED         : November 10, 1992
INVENTOR(S)   : Thomas A. Furness, Robert E. Fischer, Peter K. Purdy, and Kirk Beach It is certified that error appears in the above-identified patent and that said Letters Patent is hereby corrected as shown below:

Column 15,
Line 50, after "through which said" add -- image is viewed. --.

Signed and Sealed this

Sixth Day of November, 2001

Attest:

NICHOLAS P. GODICI
Attesting Officer    Acting Director of the United States Patent and Trademark Office